Figure 1:
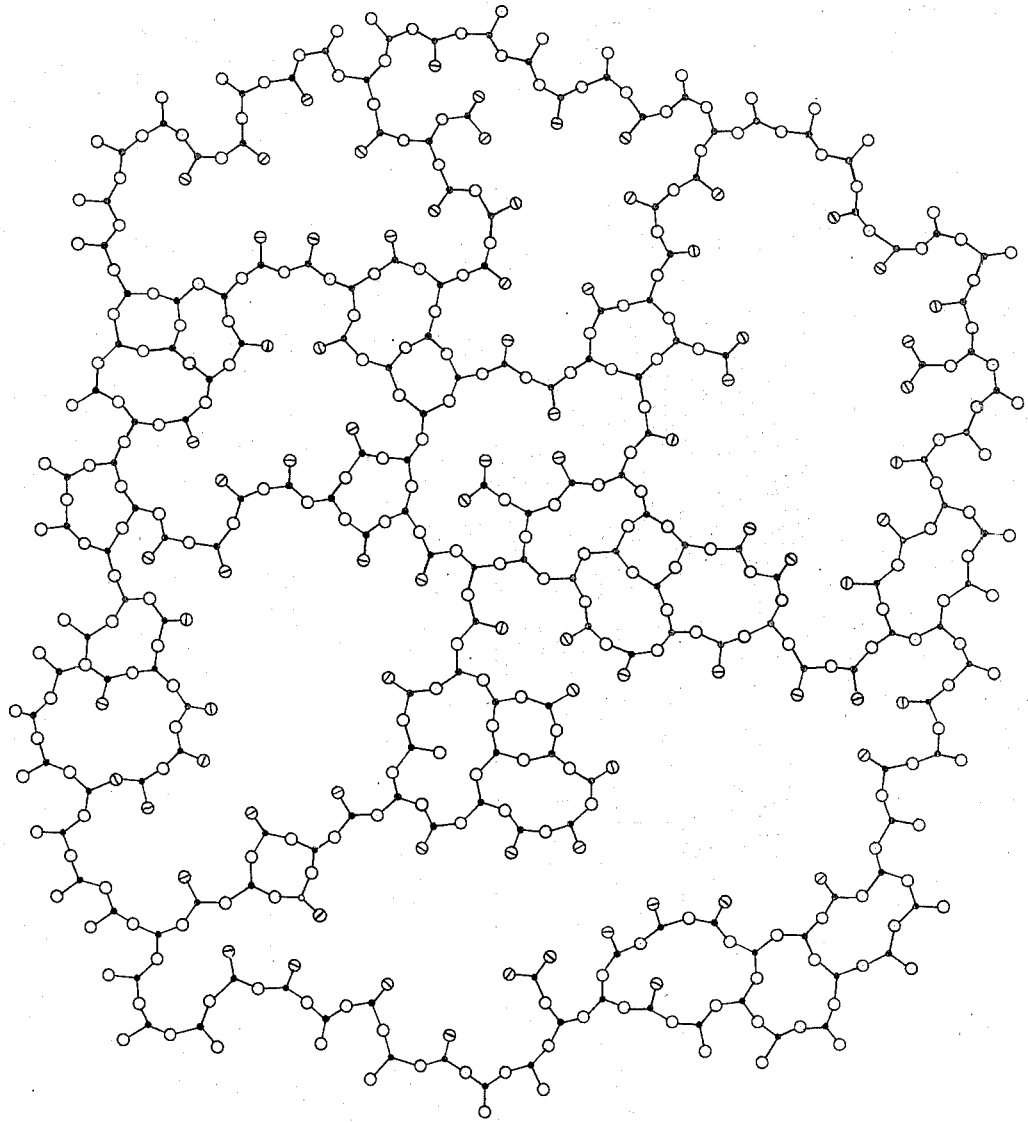

Oct. 23, 1945.　　　　M. M. MARISIC　　　　2,387,596
CATALYTIC CONVERSION OF HYDROCARBONS AND CATALYST THEREFOR
Filed July 22, 1943　　　5 Sheets-Sheet 1

INVENTOR.
MILTON M. MARISIC
BY
Oswald G. Hayes
ATTORNEY.

INVENTOR
MILTON M. MARISIC
ATTORNEY

Oct. 23, 1945.  M. M. MARISIC  2,387,596
CATALYTIC CONVERSION OF HYDROCARBONS AND CATALYST THEREFOR
Filed July 22, 1943  5 Sheets-Sheet 4
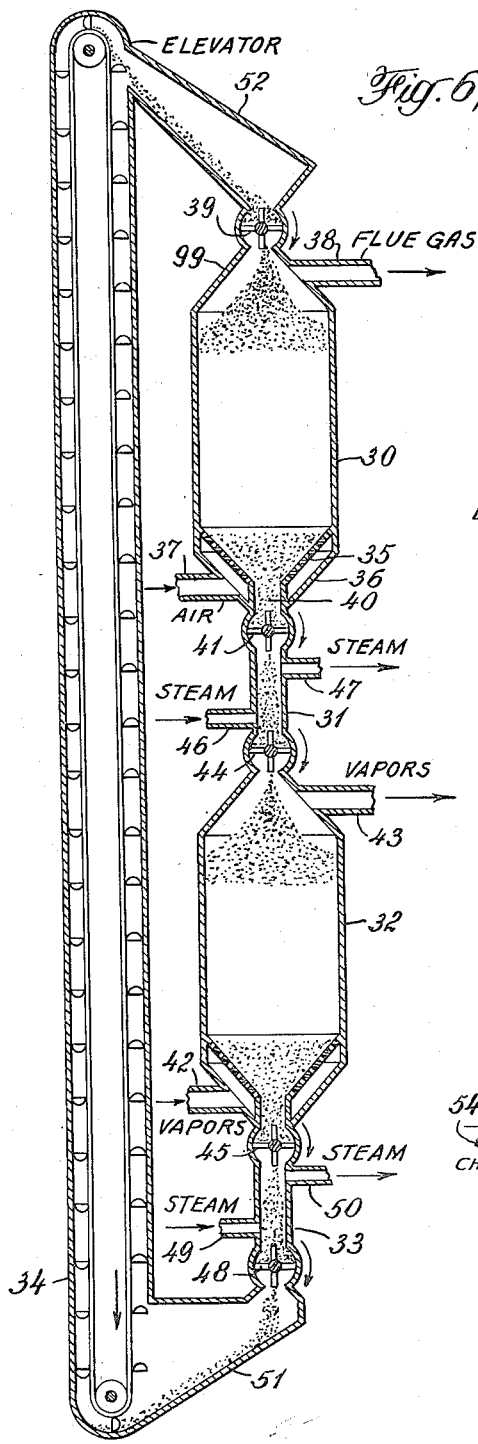
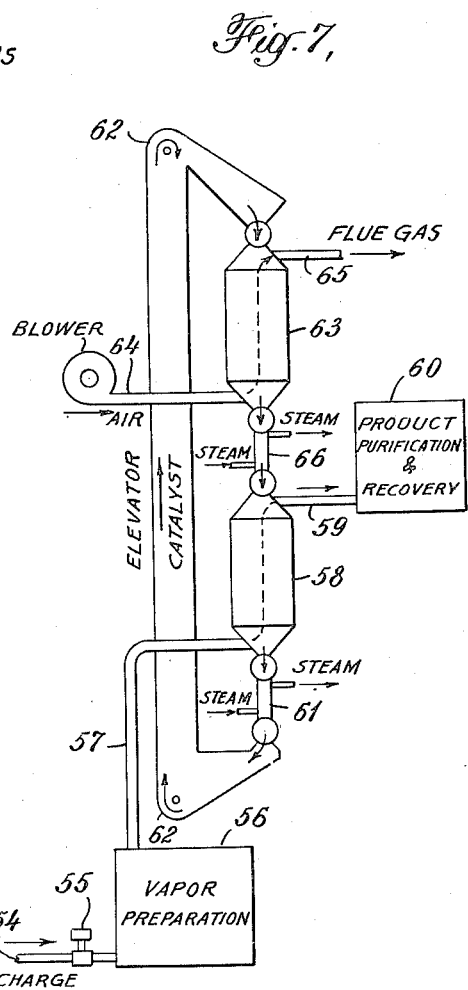
INVENTOR.
MILTON M. MARISIC
BY
Oswald G. Hayes
ATTORNEY.

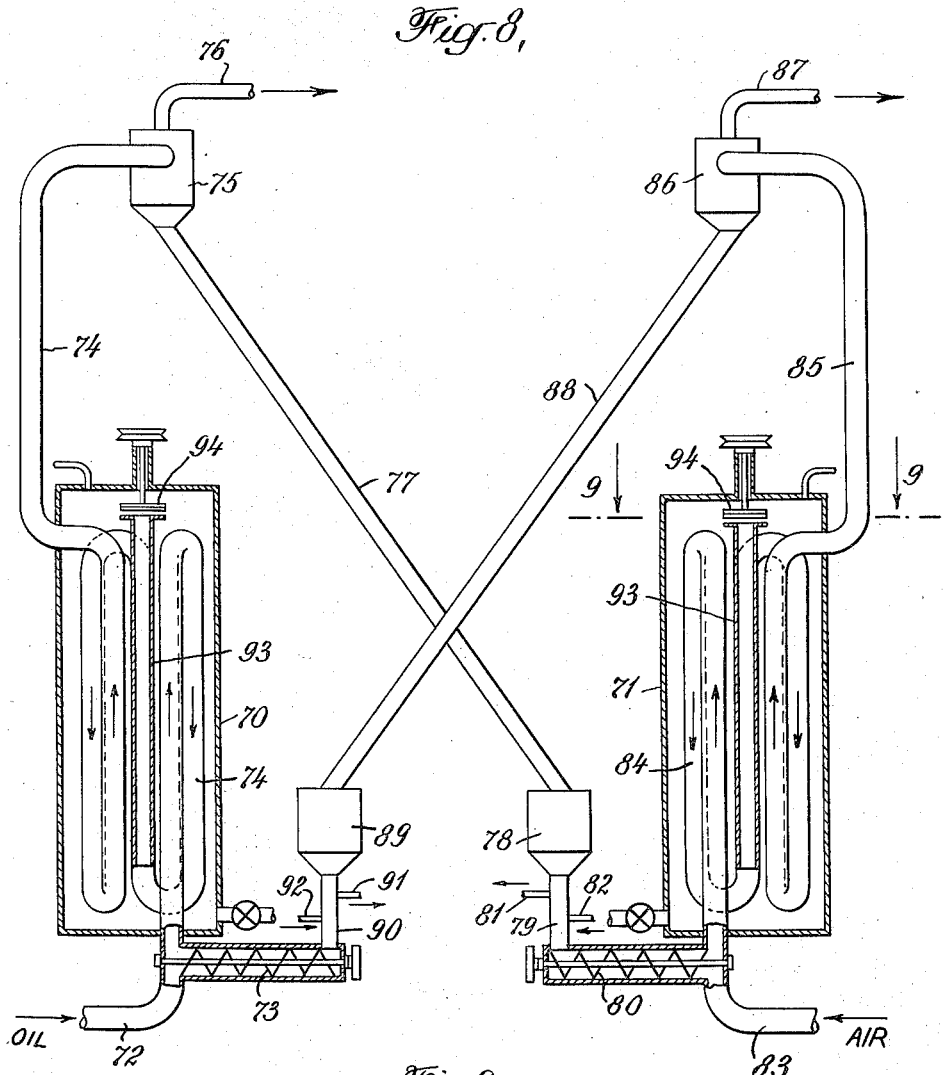

Patented Oct. 23, 1945

2,387,596

UNITED STATES PATENT OFFICE 2,387,596

CATALYTIC CONVERSION OF HYDROCARBONS AND CATALYST THEREFOR

Milton M. Marisic, Woodbury, N. J., assignor to Socony-Vacuum Oil Company, Incorporated, a corporation of New York Application July 22, 1943, Serial No. 495,674

2 Claims. (Cl. 196—52)

This invention is concerned with processes for catalytic conversion of hydrocarbons and is particularly directed to processes for conversion of hydrocarbons by contacting hydrocarbons with adsorbent synthetic solids comprising inorganic oxides which have catalytic properties. The invention also pertains to the novel catalyst herein described.

It is known that many operations for the conversion of hydrocarbon materials to other hydrocarbon materials of differing physical and/or chemical properties may be carried out catalytically. Most of these are carried out by contacting the hydrocarbon, usually in vapor form and at high temperature, with a contact mass composed of particles which themselves have a catalytic effect, or which are impregnated with or act as a support for other catalytic material of a nature appropriate to the result desired. Such operations may contemplate, for example, the conversion of hydrocarbons of high boiling point to those of lower boiling point, or the polymerization of light or gaseous hydrocarbons to hydrocarbons of higher boiling point. Other operations of like nature are catalytic isomerization, dehydrogenation, hydrogenation, polymerization, alkylation, reforming, aromatization, desulfurizing, partial oxidation and similar conversions of hydrocarbon materials. The catalyst, method of operation and apparatus herein disclosed are applicable to all such conversions. Of these operations, the vapor phase cracking of heavy hydrocarbons to gasoline is typical, and this specification will hereinafter discuss such operations as exemplary, without, however, intending to be limited thereby or thereto except by such limits as may appear in the claims.

The nature of catalysts for the present type of conversions has received intense study and catalysts of many varieties have been used. The earliest commercial catalyst used in stationary bed operations was a selected clay, which had been carefully treated and formed into small cylindrical pellets. As the art developed, attempts were made to prepare suitable synthetic catalysts of similar chemical composition. Since the clays are natural silicates containing chiefly alumina with other oxides in lesser amounts, the synthetic masses of silica and/or alumina or other metal oxides presented a fertile field. It had been known theretofore that silica, either alone or in combination with other oxides could be resolved from aqueous solutions and dried to yield porous solid masses. These solids were found to be excellent cracking catalysts as compared with the clays used previously. The nature of the resolution of solid oxides from aqueous liquid has not been regarded as a matter of any real importance and the art has generally referred to all these substances generically as "gels." Actually, silica, alumina and other oxides for the purpose may be obtained from aqueous solutions either as true gels, as gelatinous precipitates or as combinations of these forms. The former involves formation of an unstable colloidal liquid known as a sol and transition of the sol to the more stable gel which is a firm solid. The precipitates are formed promptly upon mixture of reactant solutions os flocs of irregular shape and little, if any, cohesion, suspended in a liquid.

Products obtained by mixing water glass, aluminum sulfate and sulfuric acid may be taken as exemplary of the above distinction between gels and precepitates. Thus, two solutions may be prepared for mixing. Solution A is made up by diluting 1830 grams of "N" brand sodium silicate (28.7% $SiO_2$, 8.9% $Na_2O$) to five liters with distilled water. Solution B is prepared by mixing 260 grams of aluminum sulfate $$(Al_2(SO_4)_3 \cdot 18H_2O)$$

dissolved in 3.25 liters of distilled water with 1.92 liters of 1.047 normal sulfuric acid. If solution A is added to solution B while the latter is efficiently agitated, a clear solution of pH 6.0 is formed which sets to a firm gel after about one minute. Shortly before the solution sets, it becomes somewhat opalescent and more viscous. On the other hand, if solution B is added to solution A, an entirely different type of solid resolution is observed, no matter how efficiently the solutions are mixed. Immediately upon entering solution A, the added portions of solution B cause separation of gelatinous flocs of precipitate. The instantaneous pH at resolution of different portions of precipitate changes over the time of adding solution B and the ratio between alumina and silica in the precipitate also undergoes continuous change. As the end of the course of adding solution B is approached, the amount of precipitate formed falls off and suddenly the whole solution coagulates to form a jelly-like mass which includes the precipitate dispersed therethrough. This coagulation will occur even without adding all of solution B, in fact, toward the end of the addition it is necessary to add B very rapidly in order to include it in the coagulate. No control is possible with respect to time of coagulation in contrast to the gelation process of this invention which is easily regulated and controlled.

Each of these end products is a firm mass having a vibration characteristic which makes it seem resonant when the vessel is subjected to shock, as by tapping a beaker in which it is formed. Each also occupies the full space taken up by the liquid mass from which it is formed, i. e., all material mixed together is included in the product. Here the similarity ceases; the true gel is clear and opalescent while the mixed gel and precipitate is opaque and white, the former being more resonant than the latter. The gel is homogeneous throughout so far as can be determined by usual methods of examination while the mixed gel and precipitate has a grainy appearance. The latter is made up of a multitude of precipitate particles of varying chemical composition firmly held in a gel structure which is in itself of uniform composition but which differs in chemical composition from the precipitate.

Proceeding to consideration of the prior art on the basis of the distinction between gels and precipitates explained above, the previously known synthetic catalysts for conversion of hydrocarbons include true gels prepared at high acidity, pH around 1 or below; mixed gel and precipitate, hereinafter referred to as precipitates; and porous masses of either type impregnated with substances not present in the solid phase separated from an aqueous solution in preparing the porous mass.

This invention is based on my discovery that substantially better conversions are obtained by contacting the hydrocarbons to be converted with a dried homogeneous gel containing substantially no precipitate, the hydrogel from which the catalyst is formed having been prepared at a pH of 2.5 to 10, preferably at a pH of 5 to 8.5. By this, it is not intended to exclude gels having a few small occlusions of precipitate resulting from inadequate mixing, where the precipitate constitutes a very minor part of the mass: the predominant portion of the gel being of the nature of a true gel as more fully discussed hereinafter.

The primary object of the invention is the provision of a process of catalytic conversion of hydrocarbons by contacting hydrocarbon charge material at conversion conditions of temperature and pressure with a catalyst consisting substantially of a dried homogeneous gel resulting from removal of the liquid phase from a hydrogel prepared within the pH range specified.

A further important object of the invention lies in provision of a composition of matter having improved catalytic properties consisting substantially of a dried homogeneous gel resulting from removal of the liquid phase from a hydrogel prepared within the pH range defined.

These catalysts may, if desired, be further modified by impregnation or mixing with substances having catalytic promoting, activating or other properties and such modification is contemplated within the scope of the invention.

To aid in consideration of the invention, photographic and diagrammatic illustrations are presented wherein:

Figure 1 is a two-dimensional diagram of a silica-alumina gel showing atomic arrangement;

Figures 2 to 5, inclusive, are photographic representations of typical catalysts;

Figures 6 and 7 illustrate diagrammatically apparatus for catalytic conversion of hydrocarbons; and Figures 8 and 9 are diagrammatic illustrations of another type of catalytic conversion apparatus.

Referring specifically to the cracking of higher molecular weight hydrocarbons for the production of hydrocarbons boiling in the gasoline range, use of the present catalyst produces larger yields of the desired product and, in general, the octane number of gasoline so produced is substantially higher as compared with similar products by cracking over catalysts of the prior art. Leaving the significance of the pH limitations for later discussion, it may be assumed that the better yield of gasoline is a result of nature of differences between gels and precipitates. It is generally accepted that catalytic cracking is a surface reaction and, without reviewing the evidence in favor thereof, it may be noted in passing that it cannot well be a phenomenon of any other type because of the tremendous available surface of these materials. It is known that silica gel or precipitate is not, in itself, a good cracking catalyst; something more must be included in the catalyst to produce the very superior results expected of catalytic cracking. The prior art has accomplished this by two expedients of commercial importance. Silica gels prepared at high acidity are impregnated with metal salts, such as aluminum nitrate and the mass ignited to form alumina. Beryllia, ceria, thoria, zirconia and many other metal oxides may be similarly deposited in the gel. Precipitates may be similarly treated, but the more usual practice has been formation of joint precipitates, such as the alumina-silica precipitate mentioned above.

In the art of catalysis, it is an established fact that activity of a catalyst is dependent upon the method of preparation. Even minor variations in catalyst manufacture, which to those unskilled in the art may appear to be trivial, are known to affect the catalytic efficiency profoundly. Physicochemical investigations directed to determining why conditions under which a catalyst is obtained should affect its catalytic activity have revealed that the physical structure of the catalyst, its surface area, pore volume and pore size depend on the method of preparation; hence, catalytic efficiency must be related to the physical state of the catalyst and it is clear why two materials having the same chemical composition can differ radically in their behavior as catalysts.

X-ray diffraction patterns obtained from the gels of this invention and the precipitates of prior art consist of broad diffuse bands, which indicate that both are amorphous forms of matter. By applying the X-ray diffraction technique developed for liquids to these materials and analyzing the diffraction patterns by the Fourier method, distinctions in the structures of the two materials are obtainable.

The X-ray procedure involves passing a thin beam of monochromatic X-rays through the powdered sample contained in a celluloid tube, or by reflection from the surface of a gel particle; the rays fall on a photographic plate from which, after development, a curve is obtained by a microphotometer device showing the scattering intensities at different angles. Application of the Fourier method of analysis yields directly the interatomic distances for silicon-oxygen, silicon-silicon, and oxygen-oxygen; and further that each silicon atom is tetrahedrally surrounded by four oxygens. The interatomic distances and the arrangement of oxygens around silicon in the gel and the precipitated silica correspond almost exactly with the crystalline forms of silica, however, the difference in structure between these materials is that in the latter the SiO4 tetrahedra are arranged regularly and uniformly throughout the whole mass, whereas in the gel and precipitated silica the distribution is random. Other workers have arrived at similar conclusions in comparing the structure of crystalline silica with glass and vitreous silica which are amorphous.

Microphotometer records of the diffraction patterns of silica gel and precipitated silica show considerable X-ray scattering at small angles, which indicate inhomogeneities, such as cavities or capillaries, in the structure. From these data and the gas adsorption measurements, which are to be described later, it was calculated that the average diameter of the pores or capillaries are of the order of 20 to 150 Angstrom units depending on the method of preparation. Silica glass and vitreous silica do not exhibit small angle scattering of X-rays, hence they are non-porous, possess a homogeneous medium in which the random tetrahedral network of SiO4 groups is continuously bonded in contrast to the discontinuities in silica gel and precipitated silica.

The porous nature of the gel and precipitated silica-alumina compositions are confirmed by the surface area, pore volume and pore diameter measurements as determined by the adsorption isotherms obtained by measuring the physical adsorption of nitrogen at liquid air temperatures as described by Brunaner, Emmet and Teller, The Journal of the American Chemical Society, vol. 60, pages 309-319. The adsorption measurements indicate that greater variations in the surface area and pore volume are possible with the gels of this invention than with precipitates of similar composition. With the former, surface areas ranging from 150 to 630 square meters per gram of gel and pore volumes from 0.2 to 0.9 cc. per gram of gel have been obtained as compared with the latter which have surface areas of 250 to 500 sq. meters per gram of dry precipitate and pore volumes of 0.35 to 0.65 cc. per gram. These tremendous surface areas signify that one out of every three silica or alumina molecules is exposed on the surface of the gel or precipitate.

The structure of silica-alumina gel as deduced from X-ray diffraction, adsorption measurements and chemical evidence is represented by a two-dimensional diagram in Figure 1. The open circles represent oxygen atoms while the solid circles denote either silicon or aluminum atoms. This structure is schematic, for actually each silicon or aluminum atom is associated tetrahedrally with four oxygen atoms so that the structure extends in three dimensions to form a network of tetrahedra arranged in non-symmetrical manner. The circles drawn with a line through them and shown in the diagram as bounded to only one silicon (or aluminum) are hydroxyl groups (OH). The evidence for this is that the gels contain two to four per cent of water which is very firmly held and can be driven off only by the complete destruction of the gel as by fusion. Further, base exchange with the silica-alumina gels would be impossible if hydroxyl groups were not present. As additional evidence for the presence of hydroxy groups: calculations based on the surface area occupied by hydroxyl groups arising from the firmly bound water, which amounts to 4% of the dry gel, show that these hydroxyl groups would cover an area of 166 square meters per gram of gel. This area is reasonable, considering the area not covered by OH groups as may be seen from Figure 1.

Hydroxyl groups were detected by infrared in montmorillonite clays as reported in J. A. C. S. 63, 2554-8 (1941).

The structure of precipitated silica alumina compositions is somewhat similar to that shown in Figure 1, however, the alumina is not uniformly distributed throughout the structure, but is concentrated more at one place than at another, in contrast to the uniform distribution of alumina in the gels. The importance of a uniform distribution of alumina on the surface of silica is demonstrated by the following example. On attempting to crack a fraction of gas oil over a silica gel, no gasoline was obtained. This silica gel was heated on a steam bath in a solution of aluminum sulfate for one hour in order to hydrolyze a small amount of alumina on its surface and after drying was tested under the same conditions as before in cracking gas oil. The conversion to gasoline in this case was 20%. Chemical analysis of this gel showed the presence of 0.1% alumina. Surface area measurements indicated that this small amount of alumina could cover at the most, only 0.5% of the surface of the silica gel and thus it is apparent that a surface combination of silica-alumina is essential for catalytic cracking.

Comparisons of gels and precipitates have been made which show marked advantages inherent in use of gels within the purview of the invention. These include tests with gels and precipitates of varying chemical nature under commercial conditions and the data appears conclusive when considered together. A more rigid comparison requiring citation of relatively little data appears more suited to the purposes of this application and is submitted in lieu of the mass of available data on large-scale operations. The scale of operations for this rigid comparison was such that accurate determination of octane number of the gasoline produced could not be made conveniently. It has been established, however, that octane number may be calculated with reasonable accuracy from chemical composition. The octane numbers given in Table 2 below are calculated and are not submitted as strictly accurate. The difference between octane numbers of different products is accurate, and comparison of two of the samples reported to products from comparable large scale operations indicates the octane numbers themselves are very probably accurate.

The rigid comparison mentioned was based on catalysts of different natures prepared in such manner that corresponding precipitates and gels were as nearly alike chemically as possible. Two solutions were made up which combine to form an aqueous colloidal system from which a mixture of silica and alumina will resolve to a solid phase. Solution C was prepared by diluting with distilled water 7,320 grams of "N" brand sodium silicate (28.7% SiO2, 8.9 Na2O) to 18 liters. Solution D was made up by dissolving 1040 grams

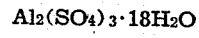

$Al_2(SO_4)_3 \cdot 18H_2O$ in 10 liters of water, mixing this solution with 5310 cc. of 2.567 normal hydrochloric acid and making up the volume to 18 liters. Solutions C and D when mixed in equal volumes will give a gel or precipitate (depending on the type of mixing as described below) containing about 93% silica and about 7% alumina on a dry basis. Catalyst masses were then made up by mixing the said solutions in the said ratio according to procedures described below.

*Precipitate.*—The sodium silicate solution C was agitated by an efficient mechanical mixer and acid solution D was added thereto until the desired ratio of solutions was obtained. During the period of mixing, gelatinous precipitate separated continuously and as soon as all of solution D was added the whole solution coagulated to a jelly-like mass of grainy, opaque appearance. The precipitate was permitted to remain undisturbed until syneresis was complete and was then broken up into pieces of about one-half inch in size. The mass of particles was washed with water to remove soluble matter, base exchanged with ammonium sulfate to replace zeolytically held sodium by ammonium which is volatilized during subsequent treatment. The catalyst was then washed clean, dried slowly and heat-treated at about 1150° F., in conventional manner.

*Gel fragments.*—A hydrogel was prepared in exactly the same manner as the precipitate except that the sodium silicate solution C was added to acid solution D with efficient agitation. The mixed solution remainder clear and free of precipitate throughout preparation of the hydrogel. Twenty-five seconds after the last drop of solution C was added, the solution became opalescent and set to a clear gel which was broken up and treated in the same manner as the precipitate.

*Bead catalyst.*—Solutions C and D were admitted to a mixing nozzle in the ratio specified above wherein they were rapidly mixed together to form a clear colloidal solution free of precipitate which was promptly passed into the top of an eight-foot column of mineral oil having a specific gravity of 0.905 and a viscosity of 320 Saybolt seconds at 100° F. The solution separated into spherical globules in the oil which set to spheroidal particles of hydrogel. The hydrogel spheroids were washed and base exchanged as above. One portion was then dried over a period of six hours, while drying of a separate portion was conducted over a period of twenty hours. Each portion was then heat-treated in the same fashion as the precipitate and gel fragments.

*Molded gel.*—A portion of hydrogel, prepared as above, was washed and base exchanged. It was then crushed, kneaded and molded in a die to form small cylindrical pellets which were dried and heat-treated in the same manner as the precipitate and gel fragments.

Each of the above catalysts was employed in catalytic cracking of a fraction of Oklahoma City gas oil boiling between 471° F. and 708° F. The oil was vaporized and superheated to 800° F. and passed at that temperature through a bed of each catalyst at a space velocity of 1.5 volumes of liquid oil per volume of catalyst per hour during a period of twenty minutes. An additional catalyst tested under the same conditions was a synthetic silica-alumina catalyst available commercially prior to this invention. This catalyst is known to be prepared from a precipitate as the term is employed here and is in the form of molded cylindrical pellets. Comparison of results obtained by larger scale operation with the prior commercial catalyst and with a bead catalyst corresponding to the above bead catalyst dried rapidly indicates the calculated octane numbers in Table 2 below are reasonably accurate.

The percentage yields of gasoline, both aviation base stock (300° F. E. P.) and motor gasoline (410° F. E. P.) are reported in Table 1, while Table 2 shows the relative quality of gasoline from each catalyst.

*Table 1*

| Catalyst | Vol. percent yield of aviation base stock | Vol. percent yield of motor gasoline |
| --- | --- | --- |
| Commercial catalyst | 33 | 43 |
| Precipitate fragments | 33 | 43 |
| Gel fragments | 40 | 51 |
| Molded gel | 40 | 51 |
| Beads, dried rapidly | 41 | 52 |
| Beads, dried slowly | 39 | 50 |

*Table 2*

| Catalyst | Aviation gasoline base stock | | | Motor gasoline | |
| --- | --- | --- | --- | --- | --- |
| | Aromatics, vol. percent | Olefins, vol. percent | Octane No. (calc.)+ 4 cc. T. E. L. | Aromatics, vol. percent | Olefins, vol. percent |
| Commercial catalyst | 10.5 | 17.1 | 95 | 23.0 | 14.2 |
| Precip. fragments | 10.5 | 17.1 | 95 | 23.0 | 14.1 |
| Gel fragments | 12.9 | 11.7 | 98 | 25.3 | 9.9 |
| Molded gel | 13.4 | 11.7 | 99 | 26.3 | 9.9 |
| Beads, dried rapidly | 14.2 | 10.1 | 100 | 26.9 | 8.5 |
| Beads, dried slowly | 14.7 | 10.2 | S+0.1 | 28.4 | 8.5 |

The octane numbers in Table 2 are reported in the manner usually used for aviation gasoline base stock, namely, as octane number of gasoline containing 4 cc. of tetraethyl lead per gallon. The rating "S+0.1" indicates equivalence to isooctane containing 0.1 cc. tetraethyl lead per gallon.

These data are highly significant. The catalysts reported fall into two very different groups on the basis of quantity and quality of gasoline produced. Within each group, either gels or precipitates, the differences are not particularly important in view of the magnitude of the experimental error. The differences between the two groups, however, are surprisingly great.

The difference in quality of the gasolines formed over the bead catalyst, the molded gel and fragmentary particles of gel may be explained on the basis that a more intimate contact between the hydrocarbon vapors and the bead catalyst is obtained. Fragmentary particles and molded pellets do not pack in a uniform manner in the cracking unit, whereas spheres yield a uniform packing and also the densest packing; hence, channeling of vapors through the bead catalyst bed is impossible and, therefore, a more efficient contact of the vapors is realized. The data on the two bead catalysts indicate that the gel structure is of great importance, for these two catalysts appear to be alike as far as their physical form, apparent density and composition are concerned; the only difference in the preparation was the method of drying.

Table 3 shows that as pH increases the apparent density of the dry gel decreases. Table 4 reveals that washing with hot water decreases the apparent density of the dry gel and in the case of the high density gels increases their cracking efficiency. This treatment reduces the activity of the high activity gels, but there is an advantage here, because the coke formation decreases in greater proportion than the gasoline make. Washing hydrogels prepared above pH 8.4 with hot water results in lower apparent densities and lower cracking activities.

Increasing the alumina content of any pH increases the apparent density. The high pH gels then will have a higher activity than shown in Table 3. For example, a gel containing 12.5% $Al_2O_3$ at pH 10 gave 37% gasoline, 2.1% coke and 4.8% gas.

The length of time that a hydrogel is washed with hot water and the temperature of the water are important; the longer the time of washing and/or the higher the temperature of the water, the lower the apparent density of the dry gel. Thus, it is possible to wash a high activity gel to a point where its activity will be greatly reduced, however, this can be counteracted to some extent by increasing the alumina content. Steam treatment of hydrogel before washing has an effect similar to hot water washing.

Partially drying a hydrogel to a water content of about 50 to 60 per cent before washing with cold water lowers the apparent density by about 10 to 15 per cent.

Heating a hydrogel in hot water after it has been washed completely in cold water results in an increase in apparent density of about 10 per cent.

The gels and precipitates in dry form may be distinguished, except in finely powdered form, on the basis of appearance by simple visual inspection. The gels are glassy in appearance, though some are not transparent but may even be milky by transmitted light. The molded gels retain this quality although the crushing and molding renders them opaque. At the molded surfaces, the latter type of gel catalyst has a characteristic appearance somewhat like a rough glass surface which has had sharp corners and angles smoothed by application of heat. This appearance is not capable of exact definition in words but is readily recognized and distinguished from the appearance of similar surfaces of molded precipitate. It is the fracture surfaces which show the characteristic glassiness in more pronounced manner. Even molded gels break with a fracture resembling glass. Those gels which have been dried without disturbance of the gel structure have fractures of conchoidal nature with large surfaces comprised by a smooth curve, while the extent of smooth curves is likely to be less in the case of molded gels.

The precipitates are characteristically chalky in appearance. Occasionally, a particle visible to the eye will occur which appears somewhat glassy and some precipitates which have been dried without disturbance of the structure by crushing and molding have several glassy portions giving the particle somewhat the appearance of a fine-grained white granite with glistening particles of mica breaking up the otherwise grainy surface appearance. The fracture of precipitates is similar to that of the surface of particles of precipitates dried as such, without disturbing the structure. Molded surfaces look very much like unglazed, white pottery of coarse texture. The fracture may also be likened to that of pottery.

Figure 2:
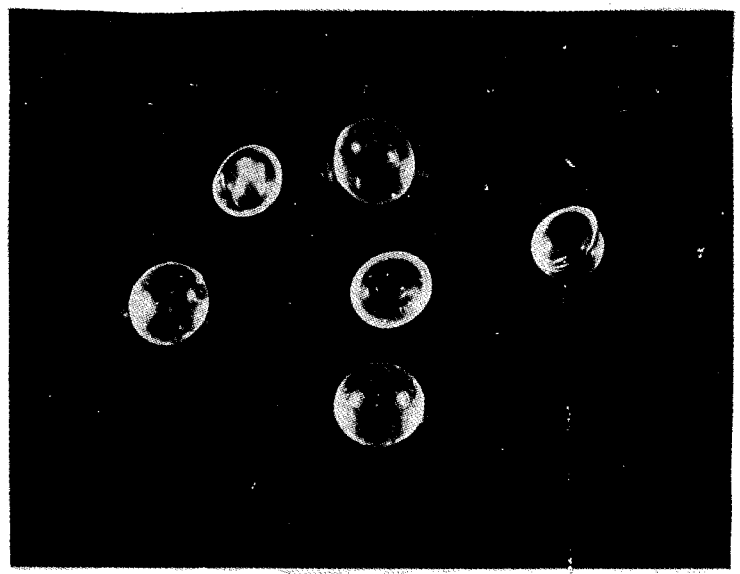
Figure 3:
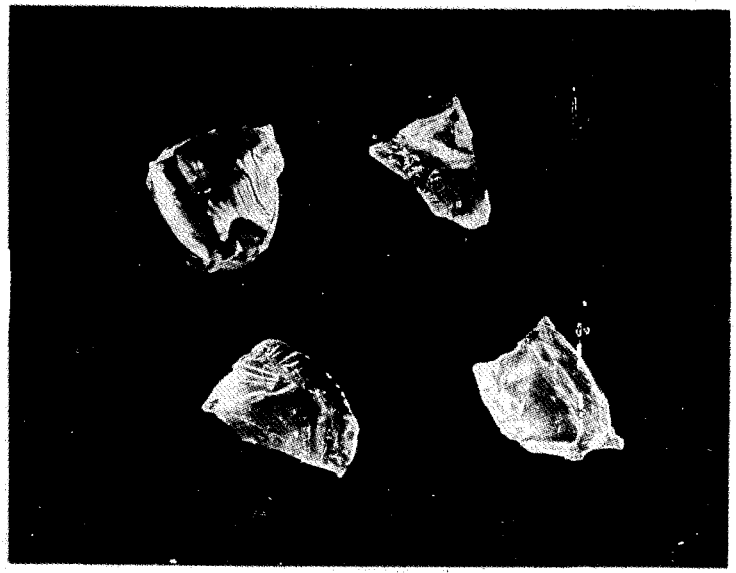

The characterizing differences between gels and precipitates visible to the eye in pieces of a size capable of inspection by the naked eye are shown in Figures 2 to 5, inclusive. These are photographs at a magnification of about 3.5 of typical forms of gels and precipitates. Figure 2 shows three whole beads and three broken beads of silica-alumina gel similar to that used in obtaining the data reported in Tables 1 and 2. The transparency and glassy appearance are here clearly demonstrated and the smoothness of surfaces is indicated by the strong reflection of the two light bulbs used for illumination. Glassiness and transparency also characterize the broken gel fragments of Figure 3. Here the nature of the fracture surfaces is more strikingly apparent than is Figure 2, but the fracture surfaces are of the same nature.

Figure 4:
Figure 5:
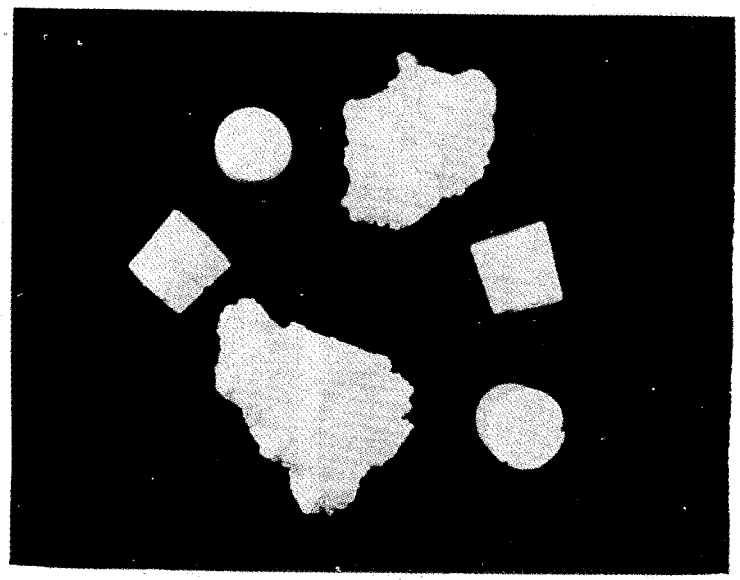

Figure 4 is a photograph of one molded precipitate pellet and several molded gel pellets. That the difference in appearance is not due to size of pellets can be seen by comparison with Figure 5 which shows molded precipitate and broken pieces of precipitate, portions of the broken pieces being as thin as the molded gel. The molded gel usually has a roughened surface and reflected light does not indicate its appearance very well unless the pellets can be moved under a fixed light. However, even a photograph gives strong indication of the glassy nature of molded gel as contrasted with molded precipitate. The chalky and grainy nature of precipitates is readily apparent in Figure 5.

Precipitates and gels have marked differences in pore volume and surface area when critically compared. A critical comparison refers, of course, to comparison of gels and precipitates which are as nearly alike as possible. The gel and precipitate described above and whose cracking activity is reported in Tables 1 and 2 are of that nature and their difference in surface area is typical. The said precipitate has a surface area of 378 square meters per gram while the gel has a surface area of 444 square meters per gram.

Among other characterizing differences, there may be mentioned the significant difference in catalytic activity, differences in hardness, and the greater crushing strength of dried gels as compared to precipitates. To some extent, the activity ranges overlap. A gel catalyst can be prepared which has a lesser activity than the high-grade precipitate catalysts. If, however, other things are equivalent (same chemical composition and similar method of preparation), the gels are normally more active than precipitates. In fact, the best precipitates are less active than a large number of gels having varying compositions. Gels, as a class, are harder and stronger than precipitates as a class. Thus, given sufficient relevant data, it is possible to distinguish between gels and precipitates even though the particles be too small to show characteristic differences in appearance. A caution to be observed in this respect is founded on the fact that the gel or precipitate is capable of modification by variations in treatment during and after preparation. For example, excessive temperatures or long exposure to the effects of steam at high temperature may drastically reduce catalytic activity of either. Thus, a gel catalyst may be so impaired by improper handling that it appears to have some characteristics of a precipitate if the treatment is not taken into account by consideration of the fact that similar improper handling results in similar impairment of either gel or pricipitate.

Referring now to the effect of pH of the solution from which the catalyst is prepared, the effect of pH on activity of the catalyst is shown in Table 3 which reports activities of a series of gel catalysts (7% $Al_2O_3$, 93% $SiO_2$) prepared by cold water washing, base exchanging, drying and heat-treating of hydrogels prepared in similar fashion from aluminum sulfate, hydrochloric acid and water glass except that the pH of the gel as formed varied in the degree reported.

*Table 3*

| pH at which hydrogel prepared | Apparent density of dry gel | Catalyst activity | | |
|---|---|---|---|---|
| | | Percent wt. coke | Percent wt. gas | Percent volume gasoline 410° F. E. P. |
| 0.27 | 0.675 | 1.7 | 2.1 | 19 |
| 3.5 | 0.946 | 2.0 | 4.3 | 22 |
| 5.3 | 0.790 | 4.4 | 8.6 | 54 |
| 7.2 | 0.746 | 4.6 | 6.5 | 56 |
| 8.4 | 0.703 | 4.3 | 6.8 | 51 |
| 9.4 | 0.591 | 3.8 | 7.3 | 42 |
| 9.9 | 0.447 | 1.8 | 3.5 | 32 |
| 10.2 | 0.384 | 1.7 | 1.9 | 24 |

Washing the hydrogel prepared at pH 3.5 with water at 160° F. yielded a catalyst which gave 43% gasoline. No improvement is obtained if the hydrogel prepared at pH 9.9 is washed with hot water. However, drying the hydrogel to a water content of 20% prior to washing resulted in a catalyst that gave 38% gasoline.

The effect of washing freshly prepared hydrogels with water at 160° F. is shown by comparison of data in Table 3 with that in Table 4 wherein the gels were washed at that temperature.

*Table 4*

| pH | Apparent density dry gel | Coke | Gas | Gasoline |
|---|---|---|---|---|
| 0.27 | 0.639 | 1.7 | 2.0 | 17 |
| 3.5 | 0.823 | 3.7 | 6.3 | 43 |
| 7.2 | 0.677 | 3.2 | 5.4 | 51 |
| 8.4 | 0.613 | 3.1 | 5.6 | 47 |

The above tables illustrate the basis for the broad pH limits of the invention. They also show the significance of the lower limit of the preferred range. The upper limit of the preferred range is more concerned with the manufacturing process. At pH values above about 8.5, it is more difficult to obtain appreciable gelation periods with reasonably high product concentration, the term "product concentration" referring to percentage dry oxides obtainable from the fresh hydrogel. This follows from the facts that gelation time decreases with increased pH and with increased product concentration. At pH values above about 8.5 the product concentration must be so reduced in order to avoid precipitation that drying requirements for comparable quantities of product are not desirable in view of the possibility of obtaining equivalent or better catalyst at lower pH and decreased drying requirements. It may be said that the invention contemplates three preferred ranges: Considering commercial desirability without major regard to activity, it is preferred to work in the range pH 2.5 to 8.5; on the basis of catalyst activity, preferred hydrogels are made at pH 5 to 10; while the optimum range is 5 to 8.5.

With respect to pH, the man skilled in the art is capable of determining from dried gels the approximate pH range employed in the manufacture by studies similar to those discussed above for differentiating gels and precipitates. Under identical conditions of manufacture, the activity and the apparent density of the product will vary with pH, although the variation in activity is slight for a considerable range of pH and apparent density.

Here, again, caution must be exercised to avoid being misled by differences in treatment. For example, as pointed out, activity may vary with temperature of the wash water. Activity may also be affected by impregnation with catalytic or non-catalytic substances. The alumina content may be varied in preparing the hydrogel or by using an aluminum salt for base exchange to remove sodium from the hydrogel, or the dried gel may be impregnated by an aluminum salt and ignited. Gels prepared from different reagents, throughout the same pH range, are not necessarily equivalent with respect to activity and apparent density. Thus, gels formed from water glass, aluminum sulfate and hydrochloric acid are similar to those from water glass, aluminum sulfate and sulfuric acid, however, substituting sodium aluminate for aluminum sulfate yields entirely different results. The activity and apparent density of gels from water glass, sodium aluminate and an acid depend upon what acid is employed.

An important aspect of pH is its effect on retention of metal oxides. Plural oxide gels prepared at about pH 1 or below lose large amounts of oxides during washing. An alumina-silica gel can be prepared at such acidity but washing with water will remove large amounts of alumina.

In order to simplify discussion, the description of the gels has been primarily with reference to alumina-silica gels. It is to be understood, however, that catalysts paralleling, in chemical composition, precipitates known to the prior art have been successfully prepared and used according to this invention. Thus, the primary component may be zirconia, alumina, titania, etc., instead of silica. The minor oxide may be incorporated by any suitable means, or eliminated. Among suitable minor components are included oxides of poly-valent metals, in general, as described in the prior art for heterogeneous catalysts having a synthetic porous base prepared by precipitation or gel formation at high acidity.

The essential feature of this invention lies in the use of a true gel catalyst prepared from a hydrogel formed in the pH range specified, but additional oxides or other agents may be incorporated as by adding to the sol before gelation, milling with the wet gel before molding or by impregnation. The compositions of this invention are highly adsorbent as is to be expected from the data given above relative to structural nature.

As noted above, the present pellets are very well suited to bed-in-place operations of the type described in the patents to Eugene J. Houdry and associates. Much greater advantages are realized, however, in continuous operation in apparatus for passing the catalyst cyclically through conversion and regeneration zones; for example, the apparatus of Figures 6 and 7.

In Figure 6, character 30 denotes a regeneration chamber, 31 a purging section, 32 a reaction chamber, 33 a second purging section, and 34 an elevator for catalyst particles. Regeneration chamber 30 and reaction chamber 32 are similar in construction and internal fittings and consist (referring now to 30), of an exterior shell 30, which may be cylindrical or rectangular in cross-section, with a convergent sealed top 99 and a convergent bottom 36, and fitted with an interior false bottom 35, which is perforated, the perforations therein being too small for the passage of catalyst particles but permitting the passage of liquid or gas. Bottom 36 is fitted with pipe 37, and top 99 with pipe 38. At the top of 99 is a sealed feeding device 39, which may be a star wheel as shown, an intermittently operated valve setup or other common device of this nature. Catalyst material introduced through 39 fills the interior of shell 30, passes down therethrough, is collected by false bottom 35 and shute 40 and is removed by a second intermittently operating device, such as star wheel 41. This arrangement effects a continuously moving stream of catalytic material through shell 30. Reaction mixture, in this case air for an oxidizing regeneration, may be introduced through pipe 37 and products of reaction, in this case flue gas, may be removed through pipe 38. This effects a continuously flowing stream of reaction material in physical contact with the continuously flowing stream of catalytic material in shell 30. The flow shown is countercurrent. If desired, it may be made concurrent by reversing the functions of 37 and 38. Shell 32 is similarly fitted and similarly operated. Reaction material, in this case hydrocarbons, is introduced by 42, and removed by 43, catalyst movement is controlled by 44 and 45. Confined passage 31, maintained relatively full of catalyst by devices 41 and 44, is fitted with pipes 46 and 47, by means of which steam may be passed through the catalyst for purging. A similar purging passage 33 lies below shell 32, is controlled by devices 45 and 48, and fitted with steam pipes 49 and 50 for purging catalyst after reaction. From 33 the catalyst drops through 48 into boot of elevator 34 by which it is elevated and discharged into bin 52 above shell 30. Elevator 34 may be of the belt and bucket type shown or of any other kind suitable for the physical properties of the catalytic materials. Customary devices for the removal of fines and the addition of makeup may be inserted in the catalyst conveyor system.

Turning to Figure 7, which shows an operating setup appropriate for a conversion of hydrocarbons, such, for example, as vapor phase cracking, charge oil is fed through pipe 54 by pump 55 to a vapor preparation unit 56. Vapor preparation unit 56 will consist essentially of a heater, for which purpose any of the usual forms of heater common in the art, say a pipe still, may be used, to heat and vaporize the charge and heat it to reaction temperature, and, if the charge used is not wholly vaporized at the reaction temperature, a vapor separator to remove unvaporized liquid residue. Vapors from 56 move through pipe 57 into and through reaction chamber 58 (the same as 32, Figure 6) and therein undergo catalytic reaction. Reaction products pass through pipe 59 to product purification and recovery equipment denoted by 60. Element 60 may be made up of any of the usual fractionation, separation, and disposal devices currently in common use for handling products of cracking reactions. If desired, product fractions boiling above the desired low-boiling product may be returned to the system for retreatment, either separately or in admixture with fresh charge. Catalytic material flowing from 58 is purged in 61 and elevated by 62 to be introduced into 63 wherein it is regenerated by burning with air supplied by blower and pipe 64, the products of regeneration being disposed of through pipe 65, after which the regenerated catalyst is purged in 66 and returned to 58.

As an example of one operation successfully conducted in such apparatus, according to the process herein disclosed, coastal gas oil with which was admixed steam to the extent of about 10 oil/1 water (cold volumes), at a temperature of 800° F. was contacted with a catalyst of activated gel pellets at a rate of one volume of oil (cold) to four volumes of catalyst in a chamber through which the catalyst passed at such a rate that it remained in the reaction about 20 minutes, with the following results:

Yield of 410° E. P. gasoline (including isobutane and heavier in gas)
    volume per cent__ 67.4
Yield of dry gas (lighter than isobutane)
    weight per cent__ 4.0
Yield of coke_____do____ 2.5
Yield of recycle stock____volume per cent__ 35.0

In this run the catalyst was passed through the regeneration chamber (of the same size as the reaction chamber) at the same rate, and was burned with a sufficient volume of air to maintain above 10% $CO_2$ in the exit flue gas.

The gasoline produced was of excellent quality, high in anti-knock rating, and the recycle stock was clean, light in color, and of about the same boiling point as the charge. No high boiling, dirty, liquid cracking tar was produced. The regenerated catalyst was equal in efficiency to new catalyst, no detectable deterioration in quality being found.

When used in the apparatus of Figures 6 and 7, the present catalyst shows very low losses arising from breakdown in size of the smallest particles used. In general, these pellets suffer losses less than 1% per day in operations where the flow of catalyst is at a rate between about 2 and about 4 volumes of catalyst per hour per volume of chamber space. The preferred catalysts, having densities above about 0.7 gram per cc. and high hardness, suffer losses less than 0.25% per day. When a plant is charged with fresh catalyst, abnormally high losses may be noted for a time if the proportion of cracked pellets is high; but cracked pellets are rapidly eliminated by breaking down and thereafter full advantage of the novel properties of the pellets is attained. Where larger pellets have been crushed and screened, substantially the same numerical values apply for losses; although losses will be a little higher than for round pellets of the same density, hardness and composition. A disadvantage of such crushed and screened particles is their tendency to score the walls of reaction chambers and concurrently accumulate iron. This results in damage to equipment and catalyst since the latter is adversely affected with respect to activity by iron content. Even with these disadvantages, the broken pieces are better than molded catalyst for the reasons discussed above, but the spheroidal unbroken pellets are, of course, regarded as preferable.

A process of the type wherein catalyst is suspended in reactant gases may be performed in the apparatus of Figures 8 and 9. Such a plant includes two chambers, namely, a reactor 70 and a regenerator 71. Catalyst is suspended in a preheated charging stock in inlet 72 by being supplied to the inlet from a continuous feeder such as screw conveyor 73. For this use, the catalyst must be of small size, usually about 80 mesh or finer, in order that it will remain suspended in the gaseous streams. The charge stock supplied as preheated vapor to inlet 72 is advantageously prepared in substantially the manner described in connection with Figure 6. The hydrocarbon vapors pass through tubes 74 in the reactor 70 wherein the desired conversion, for example, cracking to gasoline, is accomplished in the presence of the suspended catalyst. The treated vapors, still carrying suspended catalyst, are passed by line 74 to cyclone separator 75 wherein the suspended catalyst is removed and the products of the reaction are passed by outlet 76 to suitable separation and recovery equipment as in Figure 6.

The separated catalyst, which is now contaminated by a carbonaceous deposit, is transferred by pipe 77 to hopper 78, from which it is supplied by passage 79 to conveyor 80. The passage 79 may serve as a purging zone to remove vaporizable hydrocarbons from the catalyst before contact with oxidizing gases for regeneration of the catalyst. This is accomplished by passing steam or other inert gas through the catalyst from inlet 82 to outlet 81.

Preheated air is supplied to inlet 83 and the spent catalyst from conveyor 80 is suspended therein for regeneration in tubes 84 of regenerator 71. Regenerated catalyst suspended in hot regeneration fume passes by line 85 to cyclone separator 86 from which are withdrawn regeneration fume by outlet 87 and hot regenerated catalyst to flow through pipe 88 to hopper 89 from which it is again supplied to conveyor 73 by passage 90 and thence to the reactor inlet 72. Purging in passage 90 may be by steam passed in at 92 and withdrawn by 91. Since reactor 70 and regenerator 71 are of substantially similar construction, detailed description of one will suffice for both.

Regenerator 71 is equipped with a long tubular coil 84, or a similar gas passage means defined of heat conducting material, which coils through the case to give a sufficient length of travel to the air and catalyst for proper regenerating contact time so that when the catalyst leaves regenerator 71 it is fully regenerated. For temperature control, the regenerator is filled with liquid heat exchange medium which completely immerses coil 84 whereby all portions of the coil are surrounded on all sides by the liquid heat exchange medium.

As shown, coil 84 comprises a tube bundle composed of a plurality of tubes (see Fig. 9) of relatively small cross section connected in series by suitable return bends. These tubes are mounted around a central passage 93 which has both of its ends open to the interior of the chamber and thus permits circulation of the liquid heat exchange medium therethrough. The circulation of the heat exchange medium up through passage 93 and back down around the tubes is effected by means of ejector impeller pump 94, located just above the top opening of passage 93. The shaft of impeller 94 extends up through the top cover plate of the regenerator and is rotated by suitable means (not shown).

The temperature of the circulating heat exchange medium may be controlled by a suitable heating or cooling means provided around the interior or exterior of the chamber 71. It is to be understood that, if desired, the temperature control and circulation of heat exchange medium may be obtained by other means, such as, for example, circulating the medium through an exterior circuit containing a pump and heater or cooler.

For economical reasons, the catalyst passing from each case to the other case should not be permitted to cool down to atmospheric temperature, but rather should be maintained in a heated condition at all times in the cyclic process. By passing the catalyst to the next case while in a heated condition, a material advantage of operation is obtained in that time and space in the case are not required for merely heating the catalyst up to the desired treating temperature, or, at least, in heating the catalyst all the way from atmospheric temperature to the treating temperature. In some operations, it may be found desirable or necessary to place catalyst surge tanks or the like in the catalyst flow lines in order to give greater flexibility to the timing of the operations. If advisable in such operations, means for heating the catalyst at these stages may be provided so that it retains a heated condition.

In order to obtain proper temperature control, the heat exchange medium must be adjusted to a proper temperature for extracting or adding the necessary heat. Moreover, the heat exchange medium must be circulated in sufficient amount in close indirect heat exchange with every catalyst particle and then cooled or heated to readjust its temperature by means extraneous of the reaction heat before the medium's temperature reaches an undesired value. In this way liquid heat exchange medium in this embodiment continuously controls the temperature of the zone making immediate compensations for temperature changes whereby no deleterious temperatures occur.

When the operation is first started the heat exchange medium may add some heat to help initiate combustion or at least the medium should not be at such a low temperature as to prevent combustion initiation. After combustion is started, operations by this means are so efficient that heat is extracted from the exothermic regeneration reaction, i. e., in the usual case such as regeneration of cracking catalysts by burning.

The liquid heat exchange medium to be used is preferably one which at the temperatures encountered is possessed of a low vapor pressure, a high specific heat, a suitable viscosity and is not corrosive to the usual metals and other materials which may be used in construction of the apparatus. Many normally solid materials in their fused state form excellent heat exchange mediums such as fused salts and fused metals and alloys. In the regeneration of cracking catalysts, we prefer the use of fused salts. A particularly preferable mixture of this kind is a mixture of the alkali metal salts of nitric and nitrous acids. In certain cases, suitable liquid heat exchange mediums might be found which have a boiling point around the desired operating temperature, in which case, the heat exchange medium would be kept predominantly in the liquid state but might undergo some transition whereby advantage could be taken of its heat of vaporization or condensation.

In the preferred practice, the heat exchange medium is maintained at substantially the temperature of the treatment being controlled, e. g., above the minimum temperature at which proper reaction is obtained and below the minimum temperature at which deleterious results occur such as damage to the catalyst. Such practice may be carried out very effectively when the heat exchange medium is a liquid and has a relatively high specific heat. The structure of the apparatus is such that heat exchange medium is brought within close proximity to every granule in the apparatus. Hence, considerable fluctuations in temperature in either direction can be compensated by the liquid heat exchange medium without substantially altering its temperature and suitable cooling or heating of the heat exchange medium in its circuit maintains the liquid at the treating temperature.

The air rate should be sufficient to freely flow and carry the catalyst particles. It is preferable to use the minimum velocity which will accomplish this result so that the longest possible contact time will be afforded for a given length of apparatus.

Close control of temperatures in both reactor and regenerator may be achieved by full heat exchange as shown in both chambers. The conversion reaction is usually slightly endothermic and the two chambers may be made to balance each other to some extent by use of a common external circuit for heat exchange medium. However, the absorption of heat in conversion is much less than the heat evolved in regeneration. If desired, heat exchange in the reactor 70 may be dispensed with and temperature control maintained by preheating of hydrocarbon vapors and catalyst. In such case a simple enlarged chamber may be used as the reactor.

Continuous catalytic operation of this type involves some disadvantages. Complete separation of a gas from a solid suspended therein is difficult to accomplish at the rates of gas flow essential to commercial practice. However, the present high density particles separate more readily than do the previously used low density catalysts. Another important feature of the catalyst for catalysis in suspension is the hardness and resistance to mechanical breakdown. The soft, easily broken catalysts of the prior art yield relatively large quantities of fines of smaller size than the particles supplied to the apparatus. These are very difficult to separate from the gases and catalyst loss is accordingly high. The present catalyst retains its size characteristics in use to a large extent and losses are therefore minimized. There is, of course, a tendency of the suspended catalyst to act as an abrasive in a manner analogous to sand blasting. This not only wears away the equipment, but also causes the catalyst to take up foreign matter detrimental to its catalytic properties. Iron from steel members and non-metallic matter from concrete and the like all affect the catalyst activity deleteriously. It is therefore preferred that my spheroidal particles be used in suspended catalyst operation. This provides for the first time an adsorptive body capable of suspension in gases which has smooth hard surfaces whereby the catalyst breakdown is greatly reduced, blasting of equipment is largely eliminated and contamination of catalyst cut down to a practical minimum.

The catalysts formed by gelling in spheroidal form are best suited to conversion reactions by reason of their superior physical properties. These can be made in a wide variety of sizes ranging from 100-mesh or smaller prepared by spraying a gelable sol as described in my copending application Serial No. 461,453, filed October 9, 1942, to spheroids of diameters upwards of one-half inch by gelling in an oil column as described above. The small "beads" by spray gelling are particularly well suited to a process wherein the catalyst is suspended in the reactant gases.

I claim:

1. In a process of converting hydrocarbons by contact with a solid porous catalyst, the improvement which comprises contacting said hydrocarbons under conversion conditions of temperature and pressure with particles of a homogeneous composition consisting predominantly of silica and alumina prepared by a method comprising forming a clear hydrosol substantially free of gelatinous precipitate containing silica and alumina as substantially the only gel forming inorganic oxides, said sol having a pH between about 5 and about 10 and the inherent capacity to set to a firm hydrogel upon the passage of a suitable period of time without substantial change in chemical composition, gelling said sol in portions to form individual hydrogel particles having a smooth surfaces, retaining therein substantially all the components of said sol until gelation occurs, washing said hydrogel particles with water and drying the washed hydrogel, while substantially maintaining the form and structure assumed by the particles at the time of gelation, whereby the gel particles are reduced in size but otherwise not substantially affected as to form or internal structure but rather have smooth surfaces corresponding to those of the hydrogel particles and have high internal strength as compared with similar dried gel which has undergone fracture or shearing of the gel while in the hydrogel form; said composition having the characteristic glassy lustre and conchoidal fracture of a hydrogel from which the aqueous phase has been removed as contrasted with the grainy appearance and irregular grainy fracture of similar compositions containing gelatinous precipitates.

2. In a process of converting hydrocarbons by contact with a solid porous catalyst, the improvement which comprises contacting said hydrocarbons under conversion conditions of temperature and pressure with particles of a homogeneous composition consisting predominantly of silica and alumina prepared by a method comprising forming a clear hydrosol substantially free of gelatinous precipitate containing silica and alumina as substantially the only gel forming inorganic oxides, said sol having a pH between about 5 and about 8.5 and the inherent capacity to set to a firm hydrogel upon the passage of a suitable period of time without substantial change in chemical composition, gelling said sol in portions to form individual hydrogel particles having smooth surfaces, retaining therein substantially all the components of said sol until gelation occurs, washing said hydrogel particles and drying the washed hydrogel while substantially maintaining the form and structure assumed by the particles at the time of gelation, whereby the gel particles are reduced in size but otherwise not substantially affected as to form or internal structure but rather have smooth surfaces corresponding to those of the hydrogel particles and have high internal strength as compared with similar dried gel which has undergone fracture or shearing of the gel while in the hydrogel form; said composition having the characteristic glassy lustre and conchoidal fracture of a hydrogel from which the aqueous phase has been removed as contrasted with the grainy appearance and irregular grainy fracture of similar compositions containing gelatinous precipitates.

MILTON M. MARISIC.

CERTIFICATE OF CORRECTION.

Patent No. 2,387,596. October 23, 1945.

MILTON M. MARISIC.

It is hereby certified that error appears in the printed specification of the above numbered patent requiring correction as follows: Page 1, second column, line 13, for "os" read --as--; page 3, first column, line 71, for "hydroxy" read --hydroxyl--; page 5, first column, line 5, for "of" before "any" read --at--; and second column, line 69, for "pricipitate" read --precipitate--; page 9, second column, line 18, claim 1, strike out "a" after "having"; line 56, claim 2, after "particles" insert --with water--; and that the said Letters Patent should be read with this correction therein that the same may conform to the record of the case in the Patent Office.

Signed and sealed this 9th day of April, A. D. 1946.

Leslie Frazer (Seal)            First Assistant Commissioner of Patents.